United States Patent [19]

Larrea

[11] 4,435,935
[45] Mar. 13, 1984

[54] PANEL JOINING SYSTEM
[75] Inventor: D. Juan Larrea, Pamplona, Spain
[73] Assignee: Perfil En Frio, S.A. (PERFRISA), Pamplona, Spain
[21] Appl. No.: 294,922
[22] Filed: Aug. 21, 1981
[30] Foreign Application Priority Data Oct. 8, 1980 [ES] Spain ............................ 253296
Oct. 8, 1980 [ES] Spain ............................ 253397

[51] Int. Cl.³ .................................. E04B 5/52
[52] U.S. Cl. .......................... 52/461; 52/471; 52/584
[58] Field of Search ............... 52/471, 461, 463, 460, 52/465, 469, 584

[56] References Cited

U.S. PATENT DOCUMENTS

| 123,511 | 2/1872 | Robinson | 52/471 |
|---|---|---|---|
| 2,599,322 | 6/1952 | Drain | |
| 2,751,109 | 6/1956 | Moore | |
| 2,962,133 | 11/1960 | Kivett | 52/584 |
| 3,080,021 | 3/1963 | Mair | 52/471 |
| 3,228,158 | 1/1966 | Russell | 52/471 |
| 3,594,028 | 7/1971 | Scott | 52/471 |
| 3,605,368 | 9/1971 | Laloache | 52/471 |
| 3,632,149 | 1/1972 | Konig | 52/461 |
| 3,675,954 | 7/1972 | Konig | 52/584 |
| 3,854,261 | 12/1974 | Frei | 52/471 |

FOREIGN PATENT DOCUMENTS

| 106147 | 10/1923 | Fed. Rep. of Germany . | |
|---|---|---|---|
| 1495105 | 9/1967 | France . | |
| 2138215 | 1/1973 | France . | |
| 2155602 | 5/1973 | France . | |
| 2271350 | 12/1975 | France | 52/463 |
| 2446941 | 1/1979 | France . | |
| 100316 | 9/1973 | German Democratic Rep. . | |

Primary Examiner—Henry E. Raduazo
Attorney, Agent, or Firm—Eyre, Mann, Lucas & Just

[57] ABSTRACT

A panel joining system of the kind that comprises two rigid and preferably metal plates between which a suitable insulating fill material is inserted, and where the panels are arranged in flush formation to one another, and each one possesses a grooved inset with respect to the plane thereof at the end on one of its faces at least, for the purpose of inserting a join cover to conceal the connection between panels from the outside, and where each panel possesses also a second innermost slot or groove close by to the first such groove as described, for the purpose of housing a bolt head or nut whose function is to secure the join between panels and, if applicable, to attach them to a stationary anchorage.

8 Claims, 17 Drawing Figures

Figure 1:
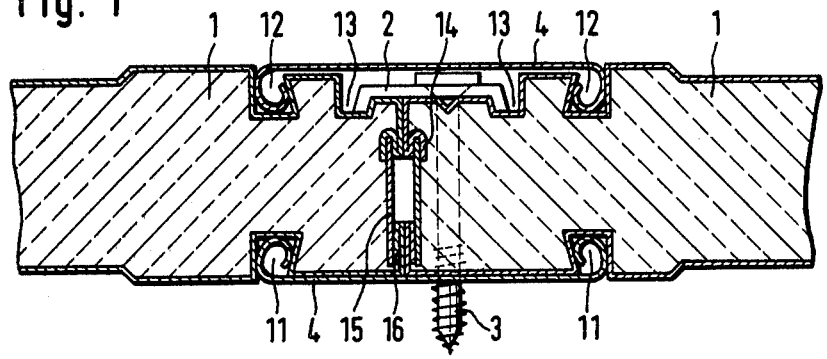
Fig. 1bis
Figure 1:
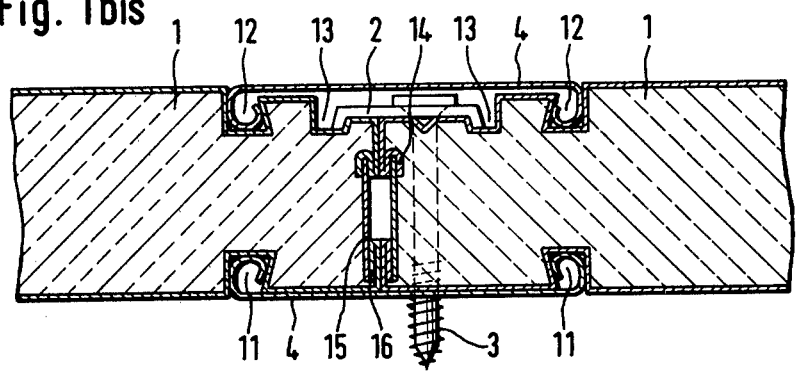

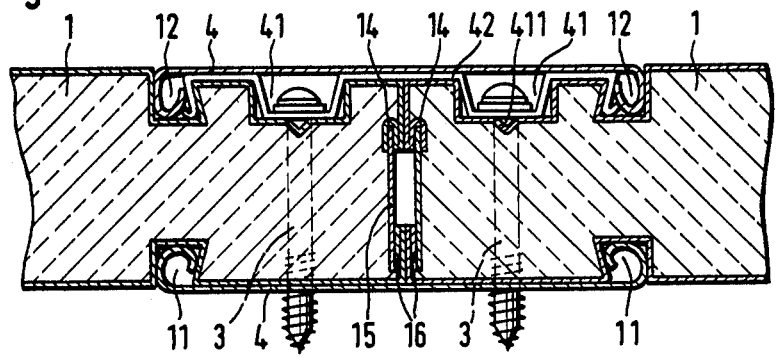
Fig. 4 bis
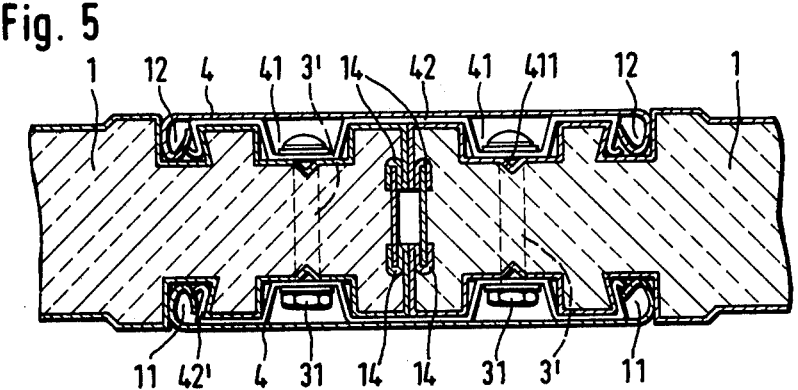
Fig. 5
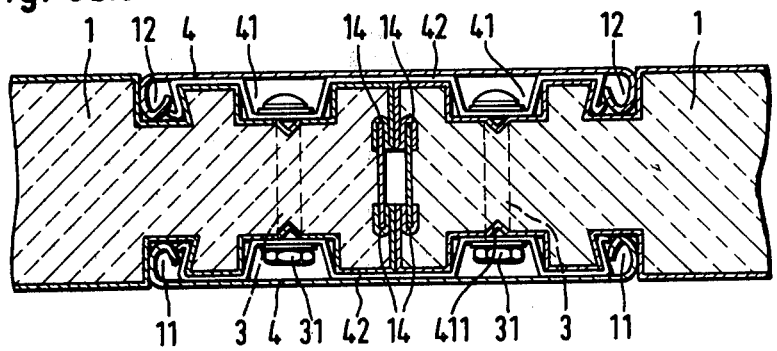
Fig. 5 bis

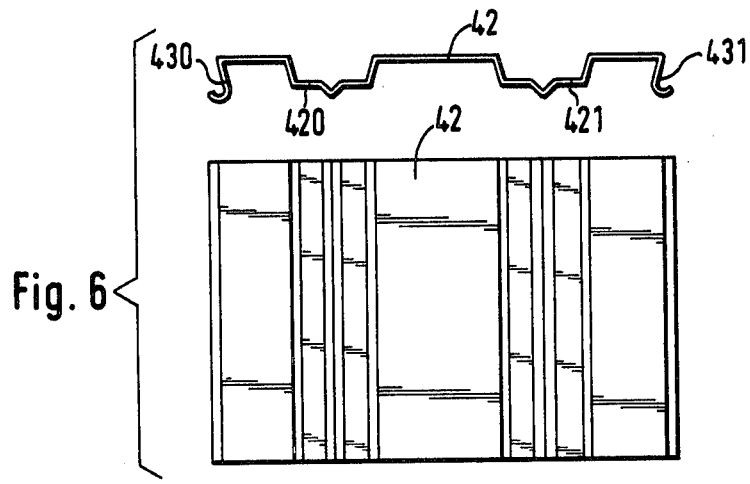
Fig. 6
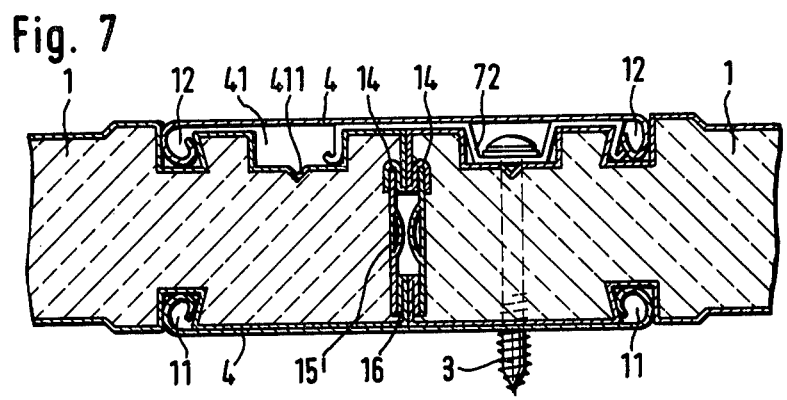
Fig. 7
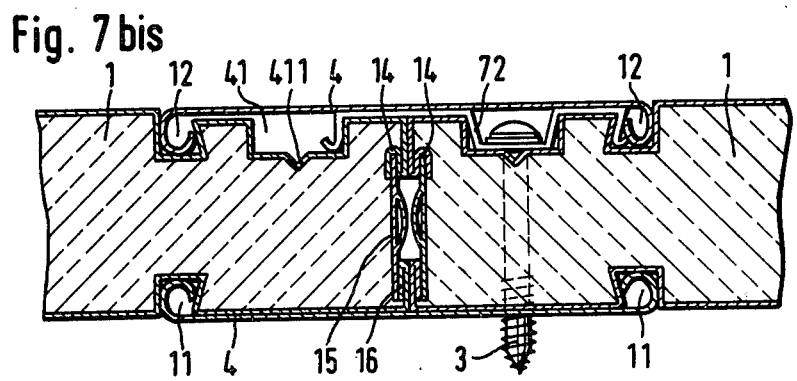
Fig. 7 bis

Fig. 8bis

PANEL JOINING SYSTEM

The present invention relates to a new panel joining system which is specifically applicable to prefabricated panels of the kind where two metal or plastic sheets are arranged parallel to one another, and the gap between them filled with a material to afford the panel heat and/or sound insulation properties, in addition to increasing its stiffness as a whole.

Spanish Pat. Nos. 313,883 and 377,036 are concerned with panels of this type, where there are male or tongued panels, and female or grooved panels. The joint between these panels, such as it is specified for example in Spanish Pat. No. 313,883, involves the need to use a joint cover, but for the purpose of executing the joint, bulges are provided at right angles with respect to the surface of the panel along its outside edge, its inside edge, or both its edges together. These bulges are secured together using any kind of clip which will draw these bulges towards one another and simultaneously conceal the seal which must necessarily be made between them.

This arrangement entails an obvious waste of material, and may even become an unsurmountable difficulty rendering such panels unsuitable for the application in question when a smooth inside or outside surface is required.

Other attempts have also been made to achieve a joint between panels which is smooth on the outside face at least. These arrangements have not been successfully put into practice up to now, because in addition to the difficulties involved in proper alignment, the joint so accomplished is not tight.

The panel joining system covered by this invention overcomes these disadvantages, since it achieves absolute tightness at the joint both on the outside and the inside or on the edges thereof, and therefore allows panels of this kind to be employed in all types of environment, including damp environments and locations that are subject to condensation.

The panel joining system covered by the invention is based upon the existence of at least one face of the panels to be joined, of at least two pairs of grooves, where one has the purpose of accommodating the fastening means (screws), and the other, being located towards the inside of each panel, close by to the first groove described (and likewise having the possibility of being made on either or both faces of the panel), serving the purpose of a drain groove, which moreover accurately accommodates a join cover which, being mounted by way preferably of insertion under simple pressure, finally encloses the join. This join covers exerts furthermore a compressive force, which tends to draw the panels to be joined towards one another.

In accordance with another feature of the invention, this join is accomplished by means of load spreader plates which may be arranged on either or both sides of the join, and which in turn are shaped so as to lie upon flat or uneven surfaces, and in either case are adapted to the form of the join, in whose grooves they are inserted by the application of pressure, and where said join is completed by means of fasteners (generally screws) which hold such load spreader plates against the panel). Said screws secure the assembled join in said panels after assembly in their working location.

These load spreader plates are pressure fitted in the grooves which are concealed by the joint cover (inserted inside the grooves that are devised as water drainage channels), and carry the securing screws which also apply a compression force which tends to draw the panels to be joined towards one another in order to enhance the efficiency of the seal and avoid the passage of water, air, dampness or similar elements.

The surface of the panel that lies between the two grooves (the inner one belonging to the actual join, and the outer one carrying the seal and devised as a water drainage channel) is slightly set back with respect to the wall which is defined by the panel, so that when the joint cover is located in position, the outer surface thereof lies in perfect alignment with the two panels and provides solely two plain surfaces belonging respectively to the two faces of the panels.

In accordance with another feature of the invention, these panels are designed either with totally smooth surfaces, or provided with staggered trapezial gaps, with pressed holes, ornamental holes or similar, where these peculiarities have no effect other than to change the structural strength of the plates making up the panels, and in no way alter the essential features of the invention.

The joining system envisaged under the present invention includes panels of the kind described which have a special shape at the sides which enables the join to be made between two of them when placed consecutively in line as intended under the invention. Such special shape on the sides allows seals to be inserted, these preferably being made from neoprene, aluminium foil or plastic, and which serve the dual purpose of holding the fill or insulation material in place between the two outside sheets while the panels are being manufactured, and to attain additional sealing properties at the sides to prevent any communication between this insulation or fill material and the outside of the panels, so as to avoid dampness.

FIG. 1 is an elevational section of a practical construction of the panel joining system being dealt with here.

FIG. 1 bis shows the same practical construction of the panel joining system as in FIG. 1, except that here it is applied to panels having totally smooth faces.

Figure 2:
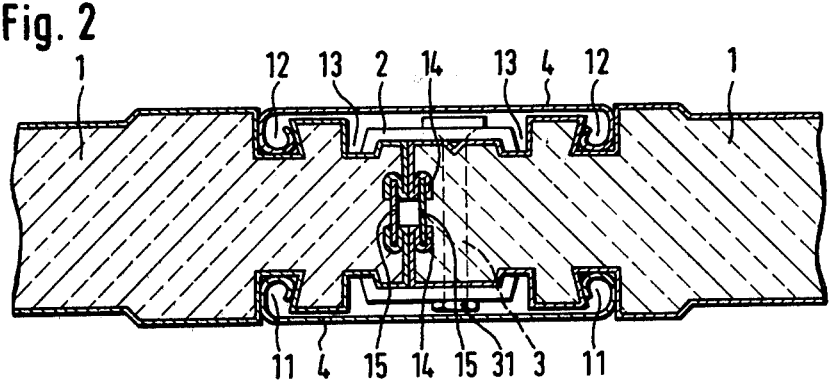
Fig. 2bis
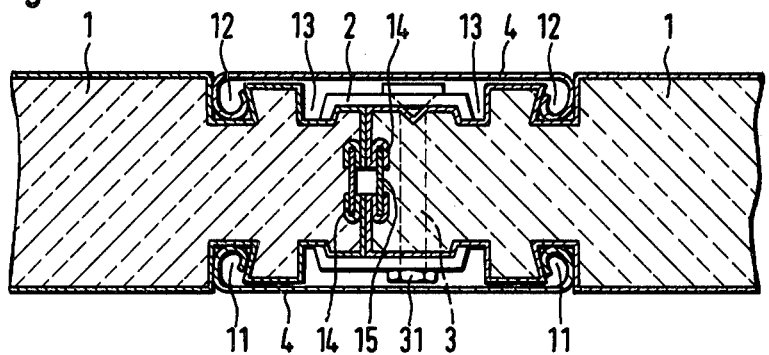
Fig. 3
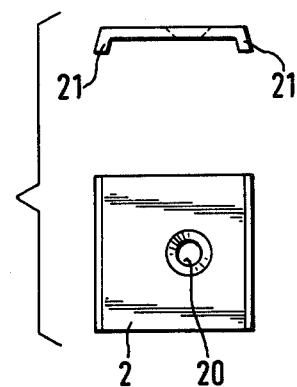
Fig. 4
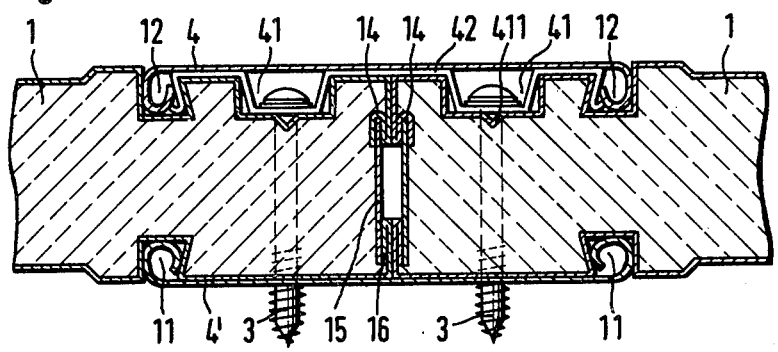

FIG. 2 is an elevational section view in exactly the same arrangement as above, but here the join as covered by the invention is symmetrical with respect to its horizontal axis, and hence sealed at both sides of the panels. This practical construction of the invention is particularly appropriate for use in humid environments, since the inside of the panels cannot suffer any damage from dampness, because said panels are totally sealed.

FIG. 2 bis shows the same practical construction of the panel joining system as in FIG. 2, except that here it is applied to panels having totally smooth faces.

FIG. 3 is an elevation and plan view of the construction of a load spreader plate which embodies the constructions shown in FIGS. 1 and 2.

FIG. 4 depicts an elevational section view of another practical construction of the joining system being dealt with here.

FIG. 4 bis shows the same practical construction of the panel joining system as in FIG. 4, except that here it is applied to panels having totally smooth faces.

FIG. 5 shows an identical elevational view to that in FIG. 4 of a similar construction, but here the joining system is applied to both faces so that there is a total seal with respect to the inside of the panels.

FIG. 5 bis shows the same practical construction of the panel joining system as in FIG. 5, except that here it is applied to panels having totally smooth faces.

FIG. 6 is an elevation and a plan view of the load spreader plate which is included in the constructions illustrated in FIGS. 4 and 5.

FIG. 7 illustrates a practical construction of the panel joining system covered by this invention where the panels, being in identical arrangement to that shown in FIG. 4, the load spreader plate possesses a different shape where the join in this case can be accomplished with the same degree of efficiency, but with a single coupling screw only.

FIG. 7 bis shows the same practical construction of the panel joining system as in FIG. 7, except that here it is applied to panels having totally smooth faces.

Figure 8:
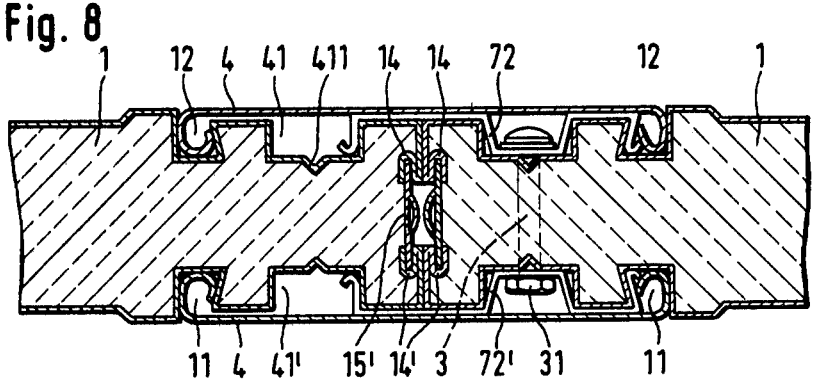

FIG. 8 illustrates a further practical construction of the panel joining system as covered by the present invention where a further screw is applied with the possibility of including a nut, although on symmetrical shaped panels only.

FIG. 8 bis shows the same practical construction of the panel joining system as in FIG. 8, except that here it is applied to panels having totally smooth faces.

Figure 9:
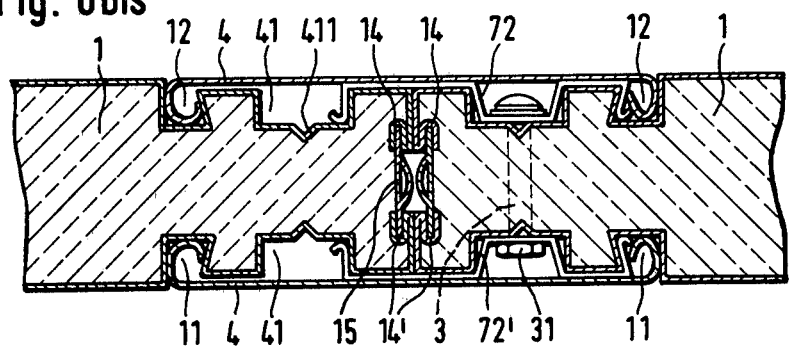
Figure 9:
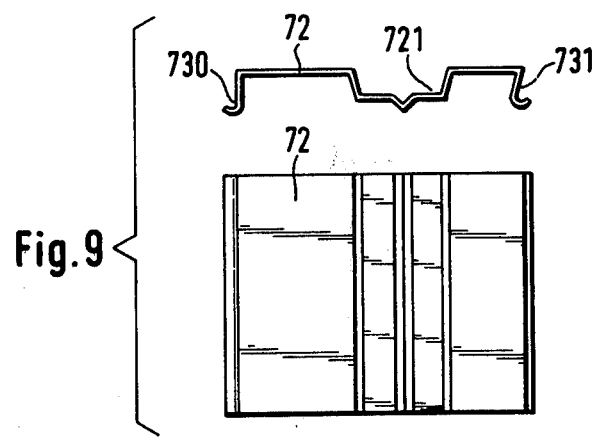

FIG. 9 depicts an elevation and plan view of the load spreader plate as required in the practical constructions illustrated in FIGS. 7 and 8.

Figure 10:
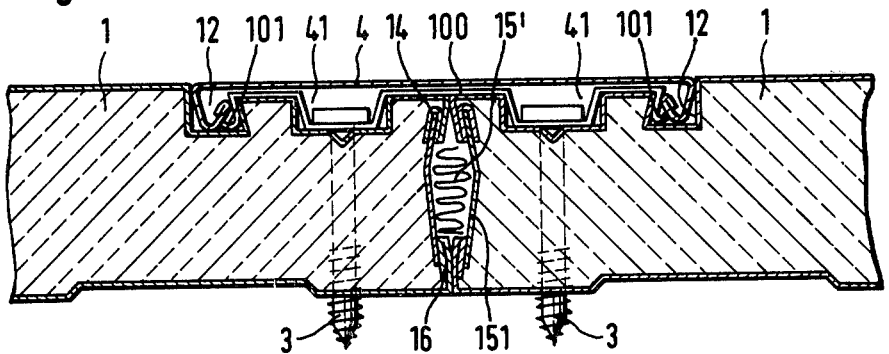

FIG. 10 illustrates a cross section view of a practical construction of the present, invention as applied to panels fitted with stiffener ribs upon one of the side sheets that comprise them only. Side sealing between these panels is ensured in the case illustrated here, by a different structuring of the side seals themselves (neoprene, aluminium foil or similar).

Figure 11:
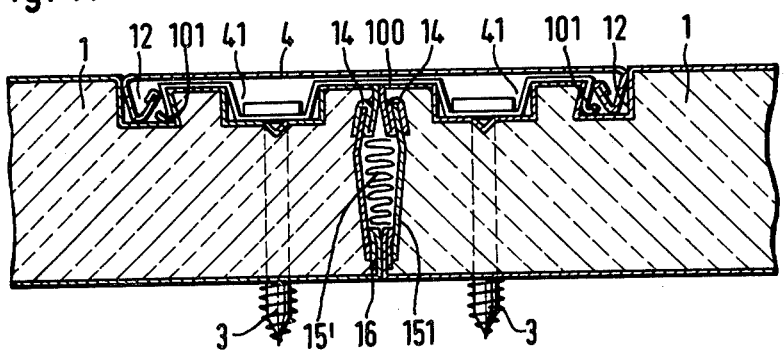

FIG. 11 shows a cross section view of a practical construction of the panel joining system as covered by the invention, applied here to panels whose side sheets are smooth and the shapes for accomplishing the join are present on the sheets belonging to one face only.

It is to be noted that all the practical constructions illustrated may be applied to all kinds of prefabricated panels with the sole requirement that the shapes shown in the drawings (or others which do not substantially alter the technical features afforded by these constructions) must be provided along their edges (or machined thereon in a subsequent stage).

The panel joining system as dealt with by this invention is for panels (1) which are comprised of two sheets between which a fill material is inserted.

According to which system under the invention is being used, then, in addition to these panels (1) to be joined, at least one load spreader plate (2) secured to both panels (1) to be joined, and at least one means of fastening (3) (generally a screw) are required.

In the practical construction illustrated in FIGS. 1 and 1bis panels (1) to be joined are symmetrical with respect to a perpendicular axis thereto, and their outer sheets between which the fill material is inserted have open trapezial grooves.

Each one of said panels (1) possesses an inverted "U" shaped groove (11) on one of its faces, where the arm closest to the end of the panel is slightly sloped, and on the opposite face it possesser two successive grooves (12 and 13). Groove (12) has the same shape as groove (11) on the opposite face, while the lower side of groove (13) defines an inside flat with respect to the panels when same are assembled together.

Likewise, the flat defined from grooves (11) towards the edge of each panel (1), and the surface defined between the two grooves (12 and 13) on the opposite face, are slightly set back with respect to the general plane of the panels.

Four sided load spreader plate (2) is generally "U" shaped in this practical construction of the invention as may be appreciated from FIG. 3 in the drawings, and its flanges (21) are slightly divergent, while a hole (20) is provided in its web.

In this practical construction, when both panels (1) are arranged side by side, the four sided load spreader plate (2) is inserted so that each one of its flanges engages on the sloping side of groove (13) so as to tend to draw panels (1) towards one another. The present practical construction of the system being dealt with is completed by inserting a fastening means (screw) (3) into the hole (20) provided in plate (2), in such a way that this screw (3) goes through said plate (2) and one of panels (1) and emerges at the other side, where it will terminate on the appropriate section, frame or structure upon which the panels are assembled with this joining system.

The invention is completed in this practical construction thereof, with two joint covers (4) which being arranged upon either side of these panels (1) as mentioned, are inserted by pressing into the appropriate pairs of grooves (11 and 12), and the web of each such joint cover lies in perfect alignment with the general side plane of the assembled panels so as to provide perfect continuity over the join.

Insofar as the side of each panel is concerned, this forms a "U" shape (14) and a fold (16) between which a seal (15) made of neoprene, aluminium foil or similar is held. Said seal (15) is subsequently positioned due to the effect of the panels being formed, and in any case affords perfect side tightness.

The practical construction illustrated in FIGS. 2 and 2 bis is wholly identical to that shown in FIGS. 1 and 1 bis respectively, but where in this latter case, each one of panels (1) is provided with two grooves (12 and 13) at the sides, and shaped in the same way as has been explained above for practical constructions described there. Accordingly, this practical construction of the system that is illustrated in FIGS. 2 and 2 bis requires two load spreader plates (2) to be mounted upon each pair of grooves (13) facing in any one direction.

In this practical construction, the screw (3) does not protrude with respect to panels (1) on the opposite side, and a nut (31) may be applied in order to compress one of the four sides plates (2).

Assembly of the joint seal (15) is performed in this case on two pairs of "U" shapes (14) facing one another symmetrically with respect to the longitudinal axis of each panel (1).

In accordance with the practical construction illustrated in FIGS. 4 and 4 bis, the two panels (1) to be joined define on one face, a groove (11) set back as a "U," but one of whose sides is not parallel to the other, where one portion of the section (1) lying between this groove and the edge of panel (1) is slightly set back with respect to the rest of the panel in this end area, to a height that coincides exactly with the thickness of the joint cover (4) which is included on this face, so that once the joint has been made and this joint cover (4) inserted in the outside plane thereof, it lies flush with the plane of the panel in this end area (at the rear, the panel possesses a number of open and/or stiffened trapezial insets). The adjacent panel (1) to be joined on possesses the same shape on this face so that the join thereupon is wholly symmetrical with respect to the centre axis defining the panels as they are joined together.

On the other face, each panel (1) possesses two successive grooves, of which a first groove (12) is identical to that (11) described above, and identical as well to that made in the aforegoing practical constructions, and a second groove (41) in a "U" section with straight sides and a slight inset (411) having a "vee" section in the centre of its bottom. The height of the portions lying between the two grooves (12 and 41), and between each groove (41) and the corresponding end of the panel (1) are such as to lie flush with one another, and be set back from the general outer plane of the panel by such an amount as to coincide exactly with the width taken up by the joint cover (4) embodied in this area, and the load spreader plate (42) which is likewise embodied in this practical construction, and engages with the two grooves (41) and the two grooves (12) (for which purpose it possesses the required geometrical shape as may be seen in FIGS. 4 and 6, where the latter show both an elevation as well as a plan view).

The join between the panels in this practical construction, once same have been longitudinally positioned with respect to one another, takes place upon inserting the load spreader plate (42) from one side so that its two insets (420 and 421) it possesses are inserted in the respective grooves (41) on the two panels, and the crooked ends (430 and 431) embrace the sloping side of each groove (12) in the direction whereby the two panels are drawn towards one another. Respective screws (3), which go through plate (42) and each panel (1) in the corresponding area, secure the join. These screws (3) protrude from the opposite side of the panel, and are anchored by insertion into a secure location, The side seal is ensured, as in the case of the practical construction depicted in FIG. 1, with two shaped sections (14) and stops (16), between each of which, a strip (15) of neoprene or aluminum foil or similar is placed.

The practical construction of the present invention illustrated in FIGS. 5 and 5 bis corresponds to the constructions shown in FIGS. 4 and 4 bis respectively, but with the join on both sides made in such a way that each panel (1) has, on the face opposite to that where successive grooves (12 and 41) are located, two pairs of grooves (12' and 41') in symmetrical correspondence with respect to the longitudinal axis of panels (1). By inserting a plate (42'), identical to the aforementioned one (42), into this second face, and by using a bolt and a nut (31) applied thereto, the continuity between panels (1) is ensured without any need for a stationary structure to secure them.

The practical construction shown in FIGS. 7 and 7 bis is basically similar to that illustrated in FIGS. 4 and 4 bis respectively, where each panel (1) has a groove (11) on one side, and on the other, two pairs of grooves (12 and 41), of which the latter possesses a "vee" shaped inset (411) in the middle. As with the construction illustrated in FIGS. 4 and 4 bis, the length on each panel (1) lying between the groove (11) and the edge of the panel is set back with respect to the outermost plane of said panel (1) by an amount which is equal to the thickness of the joint cover (4), whilst those portions lying between grooves (12 and 41) and between this latter (41) and the edge of the panel are set back with respect to the general plane thereof by an amount that is equal to the sum of the thicknesses of the joint cover (4) and the load spreader plate (72), so that with this construction of the joining system, perfect continuity is ensured on both faces once the join has been accomplished.

The load spreader plate (72) possesses in this case a single "U" section (721) with open sides, whilst its two ends (730 and 731) are set respectively at right angles and obliquely to the body of said plate (72), and have an inward facing rim. By virtue of this shape, said plate (72) is pressure inserted so that its inset (721) lies inside one of grooves (41) as defined by one of the panels, whilst its shaped ends (730 and 731) embrace respectively the straight side as defined by one of the grooves (41) on the other panel (1), and the sloping side as defined by the other groove (12) on the panel itself, into whose groove (41), shape (721) is inserted.

The joint in this case is completed with a single screw (3) which goes through plate (72) and one of panels (1) and then into a firm structure to secure it.

Tightness of the seals between the sides of panels is ensured in this practical construction by two shapes (14) and stops (16) which are identical to those in constructions specified above, and in this case a different kind of seal (15') is used for exactly the same purpose.

The practical construction of the joining systems between panels as illustrated in FIGS. 8 and 8 bis is essentially similar to the constructions shown in FIGS. 7 and 7 bis, except that in the present case, panels (1) each define a symmetrical shape with a twin pair of grooves (12 and 41) on its two faces. In this case, it is necessary to include a second plate (72') on the other face, having an identical assembly to that described for plate (72) in the practical construction shown in FIGS. 7 and 7 bis. In this case, screw (3) must be of the kind described in the constructions that are shown in FIGS. 2 and 5, and therefore capable of taking the nut (31) so that load spreader plates (72 and 72') are pressed together and both panels (1) are also pressed together so as to make a continuous join.

The practical construction shown in FIG. 10 is essentially similar to that illustrated in FIGS. 4 and 5, with the following specific connotations:

This practical construction is applicable for panels having one smooth face and the other covered with spaced trapezial insets. Said panels of this kind (1) possess no specific shape or form upon one of their faces, while one the other they possess successive insets, where insets (12) are identical to those denoted with this number in all the preceding descriptions of constructions, and where insets (41) are identical to those denoted with this number in the constructions shown in FIGS. 4,5,7 and 8.

Joint cover (4) is shaped so as to have sharp edges, or at least sharper edges than those in the preceding constructions. One of these edges abuts at an acute angle with the edge that is set most towards the inside of the straight side of each groove (12), and it provides a support point at each of its three corners, where said support points are located respectively in the aforementioned area, at the bottom of groove (12), and at the load spreader plate (100).

This load spreader plate offers its two sloping ends towards the inside in the same way as does plate (42) in the constructions (4 and 5) shown in FIG. 6, going on to form a final bend (101), which also lies upon the edge of each groove (12), so as in this way to exert pressure over a wider area and provide improved securing.

Shaped members (14) and stops (16) in preceding constructions embody a seal of identical material (151), and between two such seals of this kind, a fill material is inserted for the purpose of ensuring even further the tightness at this area (15').

Screws (3) may have different shaped heads in order to provide greater working space for assembling these panels and this kind of join in accordance with the system being dealt with.

The practical construction shown in FIG. 11 is substantially the same as the practical construction in FIG. 10, except that it comprises panels (1) whose faces are totally flat, so that there is no more than a single outside plane at all points, both on the panel as well as the join.

Finally it must be stated that as is obvious, the constructions shown in FIGS. 10 and 11 may be assembled in a totally symmetrical fashion as are those in FIGS. 2, 5 and 8, it also being necessary to note that all the practical constructions of this invention are shown purely by way of examples, and may be altered in any detailed or accessory manner as might be thought fit, without altering at all the essential features of the panel joining system covered by this invention.

The aforegoing detailed descriptive specification explains a number of practical constructions, all of which are made in accordance with the joining system which is the purpose of this invention. Reference is made in said descriptive specification to the attached drawings where said practical constructions are illustrated, and these are in no way limitative and may therefore be subjected to those minor alterations which do not alter, depart from or modify the essential features, or remove the purpose herefrom.

What is claimed is:

1. A panel-joining system for panels, said panels being of the type which include an exterior and an interior rigid sheet having an insulating fill therebetween, said panels having ends to be joined, the ends being arranged flush with one another, said system comprising:
   (a) an exterior rigid sheet of a panel which sheet includes:
      (i) a first exterior shaped section near one end of the sheet, said shaped section being a groove with respect to the exterior plane of the panel;
      (ii) a second exterior shaped section, said second shaped section being a groove arranged between the first shaped section and said one end of the sheet; and
      (iii) said end including an exterior flange perpendicular to the outer plane of the panel;
   (b) an interior rigid sheet of the panel which includes:
      (i) an interior shaped section near one end, said interior shaped section being a groove with respect to the plane of the panel; and
      (ii) said end including an interior flange perpendicular to the plane of the panel;
   (c) the panel having a seal disposed at the end thereof, said seal being sealingly situated between the exterior and interior flanges, and wherein said seal, upon abutment with a corresponding seal of a panel to be joined, cooperates to provide a space between midportions of the seals;
   (d) at least two elastic covers, said elastic covers being insertable into the corresponding exterior and interior first shaped sections of the panels to be joined;
   (e) a load spreader plate for insertion into corresponding second shaped sections of the panels to be joined, said load spreader plate being operative for holding the panels in abutment; and
   (f) means for holding said load spreader plate in position between the abutting panels for supporting said panels.

2. The system of claim 1 wherein the exterior surface between said first exterior shaped section is set back to receive the elastic cover and load spreader plate so that the outer surface of the elastic cover is substantially continuous with the external plane of the panel.

3. The system of claim 1 wherein said first shaped sections are U-shaped and have one arm of the U of different height than the other, the shorter leaning obtusely toward the end of the panel so that the opening is narrower than the bottom.

4. The system of claim 3 wherein the means for holding is a screw extending through a hole in said load spreader plate.

5. The system of claim 3 wherein the means for holding is a nut and bolt extending through load spreader plates disposed on the exterior and interior sides of the panels.

6. The system of claim 1 wherein the load spreader plate has two U-shaped segments, said U-shaped segments being adapted for fitting into the corresponding second shaped sections of said sheets, said spreader plate extending to terminate in a bend operative to be pressingly engaged in the first shaped sections of the sheets whereby the panels are drawn toward one another.

7. The system of claim 1 wherein the load spreader plate has a U-shaped segment at one end portion for fitting into one of said second shaped sections of corresponding abutting panels and the other end of the load spreader plate terminates in a bend operative for pressingly engaging the other of said second shaped sections whereby the panels are drawn toward one another.

8. The system of claim 1 further comprising an insulating fill in the space between midportions of said seals when said panels are joined.

* * * * *